United States Patent [19]

Mashino et al.

[11] Patent Number: 4,563,631

[45] Date of Patent: Jan. 7, 1986

[54] VOLTAGE REGULATOR FOR CHARGING GENERATOR

[75] Inventors: Keiichi Mashino; Keigo Naoi, both of Katsuta; Kunio Kobayashi, Takasaki, all of Japan

[73] Assignees: Hitachi, Ltd.; Hitachi Automotive Eng. Co., Ltd., both of Tokyo, Japan

[21] Appl. No.: 578,975

[22] Filed: Feb. 10, 1984

[30] Foreign Application Priority Data

Feb. 10, 1983 [JP] Japan .................................. 58-19808

[51] Int. Cl.[4] ............................................... H02J 7/14
[52] U.S. Cl. ........................................ 322/33; 320/35; 320/64; 322/28
[58] Field of Search ............... 322/28, 33, 36; 320/35, 320/36, 39, 40, 64

[56] References Cited

U.S. PATENT DOCUMENTS

| | | | |
|---|---|---|---|
| 3,600,661 | 8/1971 | Briggs et al. | 322/33 X |
| 3,602,796 | 8/1971 | Bleher | 322/33 X |
| 3,736,489 | 5/1973 | Mullersman | 320/35 |
| 4,027,231 | 5/1977 | Lohrmann | 320/48 X |
| 4,220,908 | 9/1980 | Nicol | 320/35 X |
| 4,385,270 | 5/1983 | Balan et al. | 320/35 X |

*Primary Examiner*—R. J. Hickey
*Attorney, Agent, or Firm*—Antonelli, Terry & Wands

[57] ABSTRACT

A voltage regulator for a charging generator comprising an a.c. generator, a rectifier for converting the a.c. output of the a.c. generator to a d.c., a battery connected to the output of the rectifier, comparison means for comparing the battery voltage with a reference voltage of a reference voltage generation circuit and a power transistor controlled by the output of the comparison means and controlling a current flowing through a field coil of the a.c. generator.

The reference voltage generation circuit comprises a voltage divider connected to a constant voltage power source and providing its divided voltage as the reference voltage, a plurality of transistors connected in parallel with a part of the voltage divider, and conduction control means for controlling the transistor in accordance with the ambient temperature so that the reference voltage is determined in accordance with the ambient temperature.

9 Claims, 3 Drawing Figures

VOLTAGE REGULATOR FOR CHARGING GENERATOR

BACKGROUND OF THE INVENTION

This invention relates to a voltage regulator for a charging generator and more particularly, to a voltage regulator for a charging generator which is particularly suitable for use in a battery charging generator actuated by an automobile engine.

Voltage regulators for a charging generator regulate the output voltage of the charging generator and hold the voltage of a battery connected to the charging generator at a predetermined value. An example of such voltage regulator is disclosed in U.S. Pat. No. 3,718,849. In this device, an initial exciting current is caused to flow through the field coil of the generator from the battery through a charge lamp at the time of start by turning on a key switch. When the output voltage rises in accordance with the revolution of the generator, the exciting current is caused to directly flow from the output of the generator. For this reason, the charge lamp is lit at the initial excitation but is turned off when the output voltage of the generator rises. On the other hand, as the output voltage of the generator rises and the battery voltage also rises, the supply of the exciting current to the field coil is cut off. Accordingly, the exciting current attenuates and the output voltage of the generator drops. As the terminal voltage of the battery drops, the exciting current is again supplied to the field coil, raising the output voltage of the generator. A sequence of these operations are repeated to regulate the battery voltage to a constant voltage.

In the voltage regulator of the kind described above, the charging characteristics of the battery vary with temperatures so that the output voltage of the generator must be regulated in accordance with the temperatures. The voltage is controlled in such a fashion that the output voltage of the generator rises when the battery temperature is low and drops when the temperature is high.

In this instance, the relation between the voltage and an electric load to be connected to the battery must be taken into consideration. A current is ordinarily applied from the battery to the load such as a head light, various motors and the like of the automobile. If this impressed voltage is too high, the service life of the head light or the like is reduced and drop of the intensity of illumination of the head light, drop of the motor output and the like will occur.

It is therefore preferred to hold the voltage at a predetermined upper limit below a certain temperature and at a predetermined lower limit above a certain temperature and to regulate the voltage in match with optimum charging characteristics of the battery between these temperatures as disclosed in Japanese Patent Laid-Open Application No. 55-13629 (1980). In this case, a device having a simple circuit construction and yet making it possbie to set the characteristics must be realized.

SUMMARY OF THE INVENTION

The present invention is directed to provide a voltage regulator for a charging generator which can realize the temperature characteristics suitable for the battery and the electric load with a simple circuit construction and yet whose temperature characteristics can be set easily.

The object of the present invention can be accomplished by a voltage regulator which consists essentially of an a.c. generator having armature windings and a field coil, a rectifier rectifying the output of the a.c. generator, a battery receiving the output of the rectifier, switching means for controlling the current flowing through the field coil, reference voltage generation means for determining the voltage to be supplied to the battery and a comparator comparing the reference voltage with the battery voltage and controlling the switching means, wherein the reference voltage generation means comprises a voltage divider resistor connected to a constant voltage power source and providing its divided voltage as the reference voltage, a plurality of switching means connected parallel to a part of the voltage divider resistor for changing the voltage division ratio in accordance with the ambient temperature and forming a bypass circuit when they become conductive, and means for controlling the conduction of the switching means in accordance with the ambient temperature.

In the construction described above, the characteristics of the reference voltage can be easily changed by adjusting the resistance value of the voltage divider resistor.

In the present invention, means for rendering the switching means conductive includes a thermosensitive element whose terminal voltage changes in accordance with the ambient temperature, an operational amplifier amplifying the voltage of the thermosensitive element and constant voltage elements which are disposed between the output terminal of the operational amplifier and a plurality of the switching means, respectively, to become sequentially conductive in accordance with the output voltage of the operational amplifier and render the switching means conductive.

In the construction described above, the characteristics of the thermosensitive element, operational amplifier and constant voltage elements are selected so that all the switching means become non-conductive when the ambient temperature is below a predetermined temperature and the reference voltage reaches its maximum value, and when the ambient temperature is above a predetermined temperature, all the switching means become conductive and the reference voltage reaches its minimum value.

In a preferred embodiment of the present invention, the thermosensitive element is a diode. In particular, a plurality of diodes can be connected in series to form the thermosensitive element. The switching means preferably consists of transistors. A diode is used as the constant voltage element. In particular, the number of diodes connected to each of the transistors to determine the voltage at which each of the transistors will be rendered conductive is set to achieve a predetermined sequence of operation for turning on said transistors based on the operational amplifier output.

The diodes which serve as the thermosensitive element and the constant voltage element can be formed by short-circuiting the collector of a transistor to its base. This arrangement makes it possible to equalize the base-emitter voltage of the transistor as the switching means to the forward voltage of the diode as the thermosensitive element and constant voltage element; hence, the operational characteristics can be easily examined.

DESCRIPTION OF THE PREFERRED EMBODIMENT

Figure 1:
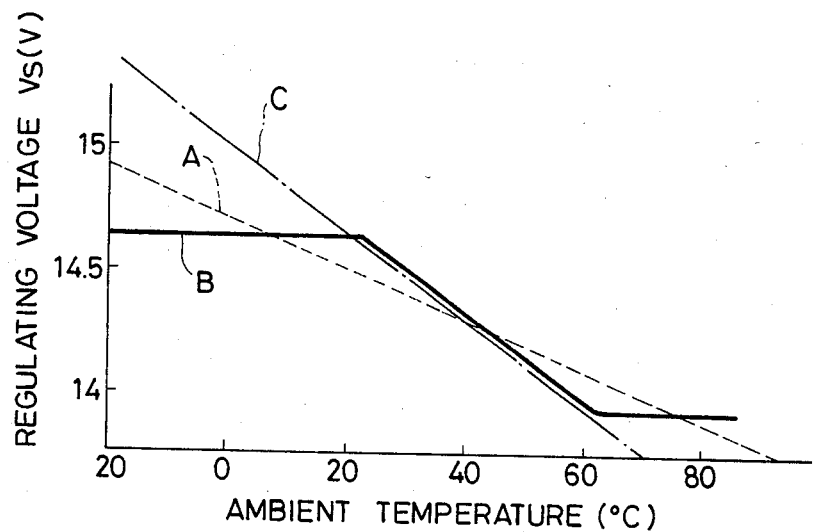
FIG. 1 is a diagram showing the temperature characteristics of a regulating voltage as the charging voltage of a battery.

First, the relation between the battery temperature, that is, the ambient temperature, and the regulating voltvoltage as the charging voltage of the battery will be explained with reference to FIG. 1. In the diagram, line A represents the characteristic curve that has been used widely in the past while line B represents the preferred characteristic curve as the basis of the present invention. Line C represents the characteristic curve representative of the charging characteristics of the battery. When the charging characteristics of the battery are taken into consideration, the regulating voltage is preferably regulated as represented by line C but the problem here is that the feed voltage is too high at low temperatures and is too low at high temperatures in conjunction with an electric load connected to the battery. Accordingly, the conventional voltage regulator sacrifices the charging characteristics of the battery to reduce the change width of the voltage as represented by line A. However, the regulator preferably satisfies both charging characteristics of the battery and characteristics of the electric load such as represented by line B. The present invention provides a voltage regulator for a charging generator which has the ambient temperature-v-regulating voltage characteristics such as represented by line B.

Figure 2:
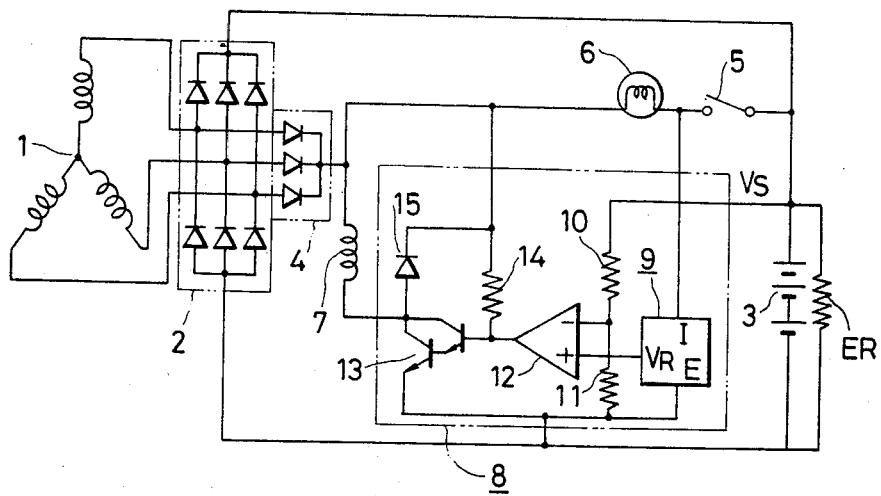
FIG. 2 is a circuit diagram of a voltage regulator for a charging generator in accordance with one embodiment of the present invention.

FIG. 2 is a circuit diagram of the charging generator in accordance with one embodiment of the present invention. The output terminals of a Y-connected armature coil 1 of the generator is connected to the terminals of a battery 3 through a three-phase full-wave rectifier 2. On the other hand, the output terminal of an auxiliary rectifier 4 is connected to a charge lamp 6 connected in series with a key switch 5, whose one end is connected to the terminal of the battery 3, and to one end of a field coil 7. A voltage regulator 8 consists of a reference voltage generation circuit 9 connected to the battery 3 through the key switch 5, a comparator 12 which compares the output $V_R$ of the reference voltage generation circuit 9 with a divided voltage obtained by dividing the battery voltage by voltage divider resistors 10, 11 and produces its output, a power transistor 13 which is controlled by the output of the comparator 12 and is connected to the other end of the field coil 7, a circuit which supplies a base current to the power transistor 13 through a resistor 14, and a flywheel diode 15. As shown in FIG. 2, the power transistor 13 can be formed as a Darlington connection, if desired, for high gain. An electric load ER is interposed between the terminals of the battery 3.

In the construction described above, the output of the comparator 12 is at the high level when the voltage of the battery 3 is low and the power transistor 13 is conductive. On the other hand, when the voltage of the battery 3 is high, the output of the comparator 12 is at the low level and the power transistor 13 is cut off.

Accordingly, the regulating voltage $V_s$ can be given by the following equation with $V_R$ representing the output voltage of the reference voltage generation circuit 9 and with $R_{10}$ and $R_{11}$ being the resistance values of the resistors 10 and 11, respectively:

$$V_s = (1 + R_{10}/R_{11}) \cdot V_R \tag{1}$$

In other words, the construction described above regulates the regulating voltage $V_s$ in accordance with the output voltage $V_R$ of the reference voltage generation circuit 9.

Figure 3:
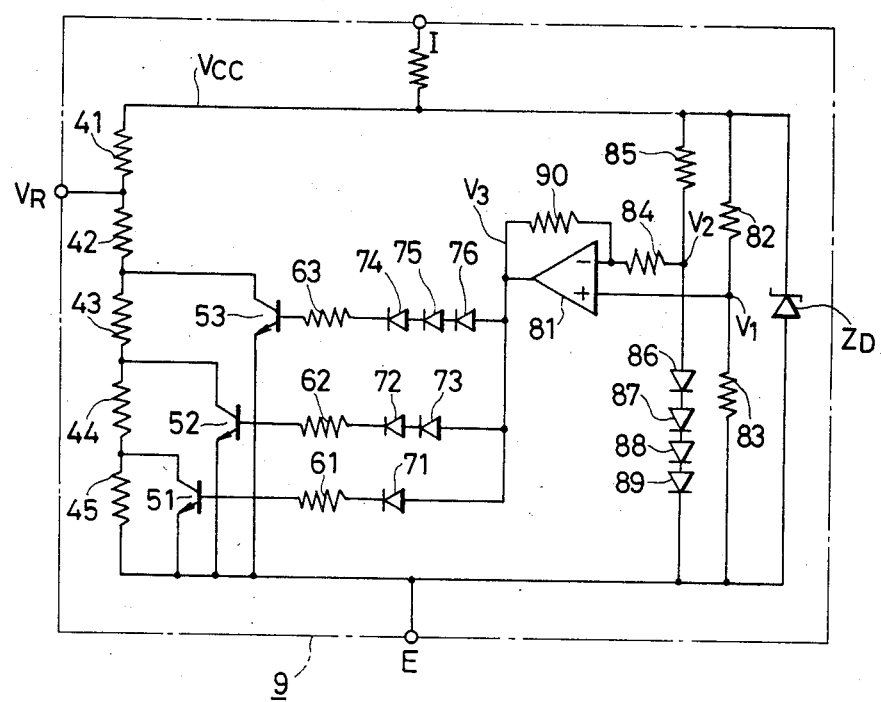
FIG. 3 is a circuit diagram of a reference voltage generation circuit in FIG. 2.

Next, FIG. 3 illustrates a definite example of the reference voltage generation circuit 9. In the drawing, voltage divider resistors 41 through 45 divide the voltage $V_{cc}$ generated by a zenor diode ZD. A first transistor 51 is connected to both ends of the voltage divider resistor 45 and its base is connected to the output terminal of an operational amplifier 81 via a resistor 61 and one diode 71 as a constant voltage element. A second transistor 52 is connected to both ends of a series circuit of voltage divider resistors 44 and 45 and its base is connected to the output terminal of the operational amplifier 81 through a resistor 62 and a series circuit of two diodes 72 and 73 as a constant voltage element. A third transistor 53 is connected to both ends of a series circuit of voltage divider resistors 43, 44 and 45 and its base is connected to the output terminal of the operational amplifier 81 through a resistor 63 and a series circuit of three diodes 74 through 76.

One of the input terminals of the operational amplifier 81 is connected to the voltage dividing point of resistors 82 and 83 that are connected in parallel with the zenor diode ZD. The other input terminal of the operational amplifier 81 is connected to the junction between the resistor 85, which is connected in parallel with the zenor diode ZD, a series circuit of diodes 86 through 89, which are likewise connected in parallel with the zenor diode ZD and are the thermosensitive elements, via the resistor 84. Reference numeral 90 represents a resistor. It will be assumed that the voltage at the voltage dividing point by the resistors 82 and 83 is $V_1$, the anode voltage of the diode 86 is $V_2$ and the output voltage of the operational amplifier 81 is $V_3$ and $$V_2 = 4V_{BE} \tag{2}$$

(with the proviso that the base-emitter voltage of the transistors 51 through 53 is equal to the forward voltage of the diodes 71 through 76 and 86 through 89 and is represented by $V_{BE}$).

In this case, the output voltage $V_3$ by an inversion amplification circuit is given by the following equation with $R_{84}$ and $R_{90}$ representing the resistance of the resistors 84 and 90, respectively:

$$V_3 = \left(1 + \frac{R_{90}}{R_{84}}\right) V_1 - 4 \cdot \frac{R_{90}}{R_{84}} \cdot V_{BE} \tag{3}$$

As the voltage $V_3$ changes from the low voltage to the high, the transistors 51, 52 and 53 become sequentially conductive and a voltage division ratio, which determines the output voltage $V_R$ of the reference voltage generation circuit, changes. The output voltage $V_R$ can be considered in the following four cases within the saturation range of the transistors 51 through 53 depending upon their conductive or non-conductive state.

The resistors 41 through 45 are assumed to have the resistance values $R_{41}$ through $R_{45}$, respectively:

(1) When all the transistors 51 through 53 are cut off:

$$V_R = \frac{R_{42} + R_{43} + R_{44} + R_{45}}{R_{41} + R_{42} + R_{43} + R_{44} + R_{45}} \cdot V_{CC} \quad (4)$$

The condition in which all the transistors 51, 52 and 53 are cut off is that the output voltage $V_3$ of the amplification circuit is below the forward voltage of the diode 71 and transistor 51 and is expressed as follows:

$$V_3 < 2V_{BE} \quad (5)$$

When equation (3) is put into the formula (5), $$V_{BE} < \frac{R_{90} + R_{84}}{4R_{90} + 2R_{84}} \cdot V_1 \quad (6)$$

(2) When the transistor 51 is conductive but the transistors 52 and 53 are cut off:

$$V_R = \frac{R_{42} + R_{43} + R_{44}}{R_{41} + R_{42} + R_{43} + R_{44}} \cdot V_{CC} \quad (7)$$

In the same way as above, the condition in this case is $$2V_{BE} < V_3 < 3V_{BE} \quad (8)$$

Hence, $$\frac{R_{90} + R_{84}}{4R_{90} + 3R_{84}} \cdot V_1 < V_{BE} < \frac{R_{90} + R_{84}}{4R_{90} + 2R_{84}} \cdot V_1 \quad (9)$$

(3) When the transistors 51 and 52 are conductive but the transistor 53 is cut off:

$$V_R = \frac{R_{42} + R_{43}}{R_{41} + R_{42} + R_{43}} \cdot V_{CC} \quad (10)$$

Since $$3 V_{BE} < V_3 < 4 V_{BE} \quad (11)$$

$$\frac{V_1}{4} < V_{BE} < \frac{R_{90} + R_{84}}{4R_{90} + 3R_{84}} \cdot V_1 \quad (12)$$

(4) When all the transistors 51, 52 and 53 are conductive:

From $V_R = \frac{R_{42}}{R_{41} + R_{42}} \cdot V_{CC}$ and $\quad (13)$ $$4 V_{BE} < V_3, \quad (14)$$
$$V_{BE} < V_1/4 \quad (15)$$

As an example, the following circuit constants are put:
$R_{41} = 5K$ Ohms
$R_{42} = 14K$ Ohms
$R_{43} = 940$ Ohms
$R_{44} = 1K$ Ohms
$R_{45} = 1.1K$ Ohms
$R_{90} = 20K$ Ohms
$R_{84} = 4K$ Ohms
$V_{CC} = 7$ V
$V_1 = 2.5$ V
$V_{BE} = 0.68 - 0.002 \ (T-27) V$
where T is a temperature (°C.).

The voltage division ratio of the voltage divider resistors 10 and 11 is assumed to be $$R_{10}/R_{11} = 1.7$$

and is put into equation (1), (4), (6), (7), (9), (10), (12), (13) and (15):
In the case of (1):
  regulating voltage $V_s = 14.64$ V when 27.0° C. > T.
In the case of (2):
  $V_s = 14.40$ V when 27.0° C. < T < 41.9° C.
In the case of (3):
  $V_s = 14.18$ V when 41.9° C. < T < 55.5° C.
In the case of (4):
  $V_s = 13.97$ V when 55.5° C. < T Thus, it is found that the voltage regulator has the different regulating voltages within the four temperature ranges. The foregoing description is based upon the assumption that the transistors 51, 52 and 53 are under the saturated state, the practical characteristics are smoother than the characteristics obtained by the calculation described above because each transistor passes through an active range before it shifts from the cut-off state to the conductive state, and the temperature characteristics approximate to line B of FIG. 1 can be therefore realized. In accordance with one embodiment of the present invention, a voltage regulation circuit having temperature characteristics suitable for battery charge can be easily constructed. Since this embodiment can be realized using transistors, diodes and resistors alone, the circuit is suitable for the fabrication inside a monolithic IC. Furthermore, since the diodes are used as both the thermosensitive and constant voltage elements, the circuit accomplishing the object of the invention can be formed economically.

The diodes used in the foregoing embodiment can be formed by short-circuiting the base and collector of transistors and this arrangement is suitable for matching the base-emitter voltage of transistors such as 51 to 53 with the forward voltage of the diodes such as 71 to 76 and 86 to 89.

Although the invention has been described for a reference voltage generator circuit 9 having a particular number of resistors 41 to 45 in its voltage dividing circuit along with corresponding numbers of switching elements 51 to 53, constant voltage elements 71 to 76 and thermosensitive elements 86 to 89, it is to be understood that the number of the various circuit elements could be different than that illustrated to provide a voltage dividing circuit with a different number of stages.

It is also to be understood that the above-identified arrangements are simply illustrative of the application of the principles of this invention. Numerous other arrangements may be readily devised by those skilled in the art which embody the principles of the invention and fall within its spirit and scope.

What is claimed is:
1. A voltage regulator for a charging generator comprising:
an a.c. generator having an armature coil and a field coil;
a rectifier for converting the a.c. output of said a.c. generator to a d.c.;

a battery connected to the output of said rectifier and receiving, and charged by, the power supplied from said a.c. generator;

comparison means for comparing the battery voltage with a reference voltage;

a power transistor controlled by the output of said comparison means and controlling a current flowing through said field coil;

a voltage divider connected to a constant voltage source and constructed in such a manner that the divided voltage thereof becomes said reference voltage;

a plurality of switching means connected in parallel with a part of said voltage divider and forming a bypass circuit to bypass predetermined portions of said voltage divider when they are conductive; and conduction control means for controlling the conduction of said switching means in accordance with an ambient temperature by controlling said switching means to form predetermined bypass paths to bypass predetermined portions of said voltage divider in accordance with said ambient temperature to provide a predetermined change in said reference voltage between a maximum value which occurs when all of said switching means are non-conductive and a minimum value which occurs when all of said switching means are conductive.

2. The voltage regulator for a charging generator comprising:

an a.c. generator having an armature coil and a field coil;

a rectifier for converting the a.c. output of said a.c. generator to a d.c.;

a battery connected to the output of said rectifier and receiving, and charged by, the power supplied from said a.c. generator;

comparison means for comparing the battery voltage with a reference voltage;

a power transistor controlled by the output of said comparison means and controlling a current flowing through said field coil;

a voltage divider connected to a constant voltage source and constructed in such a manner that the divided voltage thereof becomes said reference voltage;

a plurality of switching means connected in parallel with a part of said voltage divider and forming a bypass circuit when they are conductive; and conduction control means for controlling the conduction of said switching means in accordance with an ambient temperature, wherein said conduction control means includes thermosensitive elements disposed in such a manner that a terminal voltage thereof changes in accordance with the ambient temperature, an operational amplifier for amplifying the voltage of said thermosensitive elements, and constant voltage elements disposed between the output terminal of said operational amplifier and the plurality of said switching means, respectively, said constant voltage elements being arranged to provide respectively different threshold voltages so as to become sequentially conductive in accordance with the output voltage of said operational amplifier to render said switching means conductive.

3. The voltage regulator for a charging generator as defined in claim 2 wherein said thermosensitive elements are diodes.

4. The voltage regulator for a charging generator as defined in claim 3 wherein a plurality of said diodes are connected in series.

5. The voltage regulator for a charging generator as defined in claim 1 wherein said switching means are comprised of transistors.

6. The voltage regulator for a charging generator as defined in claim 2 wherein said constant voltage elements are diodes and the number of said diodes to be connected to each of said switching means is changed in accordance with the voltage to be applied.

7. A voltage regulator for a charging generator comprising:

an a.c. generator having an armature coil and a field coil;

a rectifier for converting the a.c. output of said a.c. generator to a d.c.;

a battery connected to the output terminal of said rectifier and receiving, and charged by, the power from said a.c. generator;

comparison means for comparing the battery voltage with a reference voltage;

a power transistor controlled by the output of said comparison means and controlling the current flowing through said field coil;

a voltage divider connected to a constant voltage source and constructed in such a maner that the divided voltage thereof becomes said reference voltage;

a plurality of transistors connected in parallel with a part of said voltage divider and forming a bypass circuit when they are conductive;

thermosensitive diodes disposed in such a manner that a terminal voltage thereof changes in accordance with an ambient temperature;

an operational amplifier for amplifying the voltage of said thermosensitive diodes; and constant voltage diodes disposed between the output of said operational amplifier and said transistors, respectively, said constant voltage diodes being arranged to provide respectively different threshold voltages so as to become sequentially conductive in accordance with the output voltage of said operational amplifier to render said transistors conductive, wherein all of said transistors become conductive and said reference voltage reaches the maximum voltage when the ambient temperature is below a predetermined temperature and all of said transistors become non-conductive and said reference voltage reaches the minimum voltage when the ambient temperature is above a predetermined temperature.

8. The voltage regulator for a charging generator as defined in claim 7 wherein the forward voltage characteristics of said thermosensitive diodes and said constant voltage diodes and the voltage characteristics of the base-emitter voltage of said transistors are in agreement.

9. A voltage regulator for a charging generator as defined in claim 1 wherein said conduction control means controls the conduction of said switching means to provide a substantially linear change in said reference voltage between said minimum and maximum values.

* * * * *

UNITED STATES PATENT AND TRADEMARK OFFICE
CERTIFICATE OF CORRECTION

PATENT NO. : 4,563,631
DATED : January 7, 1986
INVENTOR(S) : K. Mashino et al

It is certified that error appears in the above-identified patent and that said Letters Patent is hereby corrected as shown below:

Title page:

Under [75] Inventors:, line 1, after "Naoi" insert

--Shouju Masumoto--; change "both" to --all--.

Under [73] Assignees:, line 2, delete "both of"; after

"Japan" insert --; Katsuta, Japan--.

Signed and Sealed this

Twenty-third Day of September 1986

[SEAL]

Attest:

DONALD J. QUIGG

Attesting Officer

Commissioner of Patents and Trademarks